US010443849B2

(12) United States Patent
Ciani et al.

(10) Patent No.: US 10,443,849 B2
(45) Date of Patent: Oct. 15, 2019

(54) SEPARATE FEEDINGS OF COOLING AND DILUTION AIR

(71) Applicant: ANSALDO ENERGIA SWITZERLAND AG, Baden (CH)

(72) Inventors: Andrea Ciani, Zürich (CH); Dieter Rebhan, Albruck (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 53 days.

(21) Appl. No.: 14/973,367

(22) Filed: Dec. 17, 2015

(65) Prior Publication Data

US 2016/0178200 A1 Jun. 23, 2016

(30) Foreign Application Priority Data

Dec. 22, 2014 (EP) .................................... 14199766

(51) Int. Cl.
*F23R 3/06* (2006.01)
*F23R 3/00* (2006.01)
(Continued)

(52) U.S. Cl.
CPC ................ *F23R 3/06* (2013.01); *F02C 7/141* (2013.01); *F23M 20/005* (2015.01); *F23R 3/005* (2013.01);
(Continued)

(58) Field of Classification Search
CPC .... F23R 3/04; F23R 3/045; F23R 3/06; F23R 3/346; F23R 2900/03341; F23R 3/34; F02C 7/12
See application file for complete search history.

(56) References Cited

U.S. PATENT DOCUMENTS 4,054,028 A * 10/1977 Kawaguchi ............. F23C 6/045 431/10
4,932,861 A 6/1990 Keller et al.
(Continued)

FOREIGN PATENT DOCUMENTS

CN 103443542 A 12/2013
CN 103775215 A 5/2014
(Continued)

OTHER PUBLICATIONS

European Search Report dated Jun. 2, 2015.
(Continued)

*Primary Examiner* — Steven M Sutherland
*Assistant Examiner* — Thuyhang N Nguyen
(74) *Attorney, Agent, or Firm* — Buchanan Ingersoll & Rooney PC

(57) ABSTRACT

A combustor arrangement of a gas turbine engine or power plant is disclosed, having at least one combustion chamber, at least one mixer arrangement for admixing air or gas to the hot gas flow leaving the combustion chamber. The mixer arrangement is configured to guide combustion gases in a hot gas flow path extending downstream of the combustion chamber, wherein the mixer includes a plurality of injection pipes pointing inwards from the side walls of the mixer arrangement for admixing air portions to cool at least the hot gas flow leaving combustion chamber. The mixer arrangement is applied to at least one volume of dilution air flowing from a first plenum and at least one volume of cooling air flowing from a second plenum.

19 Claims, 4 Drawing Sheets

(51) Int. Cl.

| | |
|---|---|
| ***F23R 3/34*** | (2006.01) |
| ***F02C 7/141*** | (2006.01) |
| ***F23R 3/04*** | (2006.01) |
| ***F23M 20/00*** | (2014.01) |

(52) U.S. Cl.

CPC ................ *F23R 3/045* (2013.01); *F23R 3/34* (2013.01); *F23R 3/346* (2013.01); *F23R 2900/00014* (2013.01); *F23R 2900/03041* (2013.01); *F23R 2900/03341* (2013.01)

(56) References Cited

U.S. PATENT DOCUMENTS

| | | | | |
|---|---|---|---|---|
| 5,588,826 | A | 12/1996 | Dobbeling et al. | |
| 5,687,572 | A | 11/1997 | Schrantz et al. | |
| 6,192,688 | B1 * | 2/2001 | Beebe | F23L 7/00 60/723 |
| 7,665,309 | B2 * | 2/2010 | Parker | F23R 3/28 60/740 |
| 8,161,752 | B2 * | 4/2012 | Yankowich | F23R 3/005 60/752 |
| 8,275,533 | B2 * | 9/2012 | Davis, Jr. | F02C 7/22 60/39.5 |
| 8,457,861 | B2 * | 6/2013 | Davis, Jr. | F02C 7/22 60/39.281 |
| 9,062,884 | B2 * | 6/2015 | Rudrapatna | F23R 3/045 |
| 9,518,511 | B2 | 12/2016 | Ciani et al. | |
| 2005/0166596 | A1 | 8/2005 | Sattinger | |
| 2011/0220433 | A1 | 9/2011 | Nakamura et al. | |
| 2013/0061570 | A1 | 3/2013 | Charron et al. | |
| 2014/0033728 | A1 | 2/2014 | Marmilic et al. | |
| 2014/0109586 | A1 | 4/2014 | Ciani et al. | |
| 2014/0109591 | A1 | 4/2014 | Bothien et al. | |
| 2015/0226122 | A1 | 8/2015 | Duesing et al. | |
| 2016/0040885 | A1 | 2/2016 | Gao et al. | |

FOREIGN PATENT DOCUMENTS

| | | | |
|---|---|---|---|
| CN | 103776061 | A | 5/2014 |
| DE | 103 12 971 | A1 | 12/2004 |
| EP | 0 178 820 | A1 | 4/1986 |
| EP | 0 321 809 | A1 | 6/1989 |
| EP | 0 704 657 | A2 | 4/1996 |
| EP | 2 725 300 | A1 | 4/2014 |
| GB | 579424 | A | 8/1946 |
| JP | 59-013829 | A | 1/1984 |
| WO | WO 2014/063835 | A1 | 5/2014 |

OTHER PUBLICATIONS

Office Action (First Office Action) and Search Report dated Aug. 29, 2018, by the Chinese Patent Office in corresponding Chinese Patent Application No. 201510966598.4, and an English Translation of the Office Action. (13 pages).

* cited by examiner

SEPARATE FEEDINGS OF COOLING AND DILUTION AIR

TECHNICAL FIELD

The invention refers to a separate feedings of cooling air and dilution air (dilution medium) arrangement of a gas turbine engine or power plant, comprising at least one combustion chamber, at least one mixer for admixing a dilution air to the hot gas flow leaving the combustion chamber, wherein the mixer is adapted to guide combustion gases in a hot gas flow path extending downstream of the combustion chamber, wherein the mixer comprises a plurality of injection pipes pointing inwards from the side walls of the mixer for admixing the dilution medium or air to cool the hot gas flow leaving combustion chamber, according to the preamble of claim 1.

Preferentially, the invention refers to a gas turbine engine comprising a single combustor or a sequential combustor arrangement. The sequential combustion arrangement comprising a first burner, a first combustion chamber, a mixer for admixing a dilution gas to the hot gases leaving the first combustion chamber during operation, a second combustion chamber arranged sequentially in a fluid flow connection.

The mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second combustion chamber.

Additionally, the component of an operational arrangement concerns for example a can-combustor of a gas turbine engine. Moreover, an operational arrangement concerns also every other engine that may be subject to a combustion.

As one example the invention refers to a gas turbine engine having a pattern of several can-combustors disposed around rotational contour.

Can-combustors are self-contained cylindrical combustion chambers. Each "can-combustor" has its own fuel injector, igniter, liner, and casing. The primary air from the compressor is guided into each individual can-combustor, where it is decelerated, mixed with fuel, and then ignited. The secondary air also comes from the compressor, where it is fed outside of the liner (inside of which is where the combustion is taking place). The secondary air is then fed, usually through slits in the liner, into the combustion zone to cool the liner or liners, which are usually cooled by convective cooling, to avoid cooling air to enter into the hot gas after the flame.

Furthermore, multiple can-combustors are arranged around the central axis of the engine, and their shared exhaust is fed to the turbine(s). Can-combustors were most widely used in early gas turbine engines, owing to their ease of design and testing (one can test a single can, rather than have to test the whole system). Can-combustors are easy to maintain, as only a single can needs to be removed, rather than the whole combustion section.

The focused gas turbine engine comprising a compressor, downstream of the compressor several can-combustors, whereas the hot gases of the can-combustors are admitted to a turbine, whereas the can-combustors operating on the basis of can-combustor architecture.

Additionally, another gas turbine engine comprising a compressor, downstream of the compressor first can-combustor arrangement, whereas the hot gases of the first can-combustor arrangement are admitted to a first turbine or to a second can-combustor arrangement, whereas the hot gases of the second can-combustor arrangement are admitted to a second turbine or to a subsequent steam cycle, whereas at least one can-combustor arrangement operating on the basis of a can-combustor architecture.

Furthermore, at least one can-combustor comprising one or more disposed premixing burners or semi-premixing burners. A first turbine is connected to receive working gas from the first can-combustor arrangement, a second can-combustor arrangement is connected to receive exhausted working gas from the first turbine and to deliver working gas to the second turbine, wherein the second can-combustor arrangement comprises an annular duct forming a combustion space extending in a flow direction from outlet of the first turbine to an inlet of the second turbine, and means for introducing fuel into the second can-combustor arrangement for self-ignition combustion.

Moreover, the operational use of the apparatus of the present invention also refers preferably to a further type of combustor, namely is the cannular combustor. Like the can-combustor, can annular combustors have discrete combustion zones contained in separate liners with their own fuel-injectors. Unlike the can-combustor, all the combustion zones share a common ring (annulus) casing.

Each combustion zone no longer has to serve as a pressure vessel. The combustion zones can also "communicate" with each other via liner holes or connecting tubes or pipes that allow some air to flow circumferentially. The exit flow from the cannular combustor generally has a more uniform temperature profile, which is better for the turbine section. It also eliminates the need for each chamber to have its own igniter. Once the fire is lit in one or two can-combustors, it can easily spread to and ignite the others.

The combustor of the gas turbine engine comprising at least one premix burner, these should preferably be formed by the combustion process and objects according to the documents EP 0 321 809 A1 and/or EP 0 704 657 A2, wherein these documents forming an integral part of the present description. In particular, said premix burners can be operated with liquid and/or gaseous fuels of all kinds. Thus, it is readily possible to provide different fuels within the individual cans. This means also that a premix burner can also be operated simultaneously with different fuels.

BACKGROUND OF THE INVENTION

Due to increased power generation by unsteady renewable sources like wind or solar existing gas turbine based power plants are increasingly used to balance power demand and to stabilize the grid. Thus improved operational flexibility is required. This implies that gas turbines are often operated at lower load than the base load design point, i.e. at lower combustor inlet and firing temperatures.

At the same time, emission limit values and overall emission permits are becoming more stringent, so that it is required to operate at lower emission values, keep low emissions also at part load operation and during transients, as these also count for cumulative emission limits.

State-of-the-art combustion systems are designed to cope with a certain variability in operating conditions, e.g. by adjusting the compressor inlet mass flow or controlling the fuel split among different burners, fuel stages or combustors. However, this is not sufficient to meet the new requirements.

To further reduce emissions and operational flexibility sequential combustion has been suggested in DE 10312971 A1. Depending on the operating conditions, in particular on the hot gas temperature of a first combustion chamber it can be necessary to cool the hot gases before they are admitted to a second burner (also called sequential burner). This cooling can be advantageous to allow fuel injection and premixing of the injected fuel with the hot flue gases of the first combustor in the second burner.

Conventional cooling methods either require heat exchanger structures which lead to high pressure drops in the main hog gas flow or suggest injection of a cooling medium from the side walls. For injection of a cooling medium from the side walls a high pressure drop is required which is detrimental to the efficiency of a gas turbine operated with such a combustor arrangement and a controlled cooling of the whole flow is difficult.

With reference to WO 2014/063835 A1 a sequential combustor arrangement comprising a first burner, a first combustion chamber, a mixer or admixing a dilution gas to the hot gases leaving the first combustion chamber during operation, a second burner, and a second combustion chamber arranged sequentially in a fluid flow connection. The mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner. The mixer comprises a plurality of injection pipes pointing inwards from the side walls of the mixer for admixing the dilution gas to cool the hot flue gases leaving the first combustion chamber.

In addition WO 2014/063835 A1 describes a method for operating a gas turbine with at least a compressor, a combustor arrangement comprising a first burner, a first combustion chamber, a mixer for admixing a dilution gas to the hot gases leaving the first combustion chamber during operation, a second burner and a second combustion chamber arranged sequentially in a fluid flow connection. The mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner. The mixer comprises a plurality of injection pipes pointing inwards from the side walls of the duct for admixing the dilution gas to cool the hot flue gases leaving the first combustion chamber, and a turbine. The dilution gas is admixed into different regions of the cross section of the mixer or the dilution gas is injected through injection holes and/or second injection pipes and first injection pipes in order to introduce dilution gas into different regions of the cross section of the mixer.

Furthermore, attenuation of combustion dynamics by making use of Helmholtz dampers are widely used by all the companies operating in the gas turbine sector and several invention disclosures have been filed. The emerged state of the art focus on damper applications to can-annular-combustors. Adopting a Helmholtz damper around a can-combustor can be seen in the following documents:

US 2005/0166596 A1 describes a through-flow resonator, which when placed at or near the points having the highest acoustical pressure amplitudes within the flow path of a combustor system, effectively dampens instabilities from acoustic energy while avoiding an increase in mass air flow bypassing the system when a portion of the resonator is integral to a section of the system having a thickness in excess of about 0.10 inch. The acoustic damping performance of a resonator may be expressed in terms of acoustic conductance, which is defined as the in-phase component of volume velocity through the downstream set of holes, divided by the amplitude of pressure oscillation at the downstream face of the resonator. A high value of acoustic conductance indicates high damping performance. Consequently, the higher the acoustic conductance of a resonator, the fewer individual resonators required within a system, such as a gas turbine, to minimize potentially damaging combustion oscillations, or the greater the likelihood against the occurrence of such combustion oscillations.

US 2011/0220433 A1 provides the following solutions: A first aspect of the present object is a combustor including a cylindrical body that defines a combustion area therein, and an acoustic damper that includes an acoustic portion having an acoustic-damper resonance space communicating with the combustion area. The acoustic portion is provided along the cylindrical body so as to extend in a direction intersecting an axial direction of the cylindrical body. According to this aspect, because the acoustic portion having the acoustic-damper resonance space is provided along the cylindrical body so as to extend in the direction intersecting the axial direction of the cylindrical body, or the circumferential direction, the acoustic portion is disposed widely in the circumferential direction, without concentrating in a particular area of the cylindrical body in the circumferential direction. As a result, the acoustic portion is prevented from protruding toward the outer circumference of the cylindrical body, and the space needed outside the combustor can be reduced. Thus, because the casing can be made small, the housing constituting the casing can be made small. Because this enables, for example, the gas turbine to be adequately transported on the ground, it is possible to reduce the manufacturing costs, including the transportation costs. Furthermore, if the protrusion of the acoustic portion toward the outer circumference of the cylindrical body is reduced, the combustor can be easily extracted together with the acoustic damper. Thus, it is possible to improve the ease of maintenance of the combustor. The above-described aspect may further include an acoustic liner formed by a porous plate that constitutes the cylindrical body and has a plurality of through-holes penetrating in a thickness direction and a cover member that is provided around and at a certain distance from the porous plate so as to cover the porous plate, the acoustic liner having an acoustic-liner resonance space. By doing so, it is possible to attenuate oscillations in a frequency region that can be attenuated by the acoustic liner and oscillations in a frequency region that can be attenuated by the acoustic damper. Accordingly, it is possible to attenuate combustion oscillations in a wide frequency region. In the above configuration, it is preferable that at least part of the acoustic portion be provided on the outer circumferential side of the acoustic liner.

Accordingly, feeding directly from compressor plenum does not leave enough air for sequential liner cooling. Used air from sequential liner cooling increases risks of hot gas ingestion, overheating in regions with low pressure drop and coupling between hot gas and mixer air plenum. Another solution could be a major pressure drop increase over dilution air, but this releases detrimental effects on engine performance.

SUMMARY OF THE INVENTION

In order to introduce an innovative and inventive contribution to the mentioned state of the art, the basic idea of the invention is to feed only part of the dilution air and of the cooling air from the compressor plenum and the rest from the sequential liner exit. This inventive contribution can solve cooling problems, minimize hot gas ingestion risks, minimize self-ignition risks in the sequential burner injection unit and reduce pulsation issues.

Additionally, the technical problem which the invention intends to solve, consists in the fact that a large amount of the air used in CPSC (constant pressure sequential combustion) systems needs to be injected after the first combustion stage. Currently two options were considered:

a) Air fed from the compressor plenum making the cooling of the sequential liner extremely challenging.

b) Air from the sequential liner (used for SL cooling) posing mixer issues, risks of strong coupling between mixer plenum and hot gas with pulsation, risks of self-ignition in the injection unit and risks of hot gas injection in the mixer.

The typical configuration of an internal CPSC system consists in the fact, that the hot gas coming from the first combustion stage is cooled down to the optimum sequential-burner inlet temperature by injection of dilution air and cooling air, the latter also ensuring that metal temperature limits of the various parts are not exceeded. All the air is fed from the same plenum, in this case a plenum downstream of the SL, whose pressure is lower than Pk2 (Compressor) and whose temperature is higher than Tk2 (Compressor) due to having already used such air for SL cooling.

The idea of taking air from different plena is a basic idea of this invention. Some of the dilution air could be taken from the upstream compressor plenum with full Pk2 and a lower temperature (Tk2).

The example of feeding the first mixer row is sketched in the invention basic figure under "Detailed description of exemplary embodiments" but any other combination can be considered. This has these key advantages:

c) Reduced thermo-acoustic coupling between hot gas path and mixer plenum;

d) More effective cooling of the mixer;

e) Lower risk of hot gas ingestion;

f) Higher penetration of dilution air (→better mixing, NOx, CO, margin against overheating).

In the same figure it is also shown the idea of feeding the injection unit cooling air flowing from a plenum with higher pressure and lower temperature. This has the important advantages of lowering the risks of self-ignition of fuel recirculating in the fuel injector cooling air and providing a more effective cooling of the injection unit.

Further advantages of the invention are as follows:

Lower risks of:

Hot gas ingestion;

self-ignition in the injection unit;

thermo-acoustic coupling between hot gas and mixer plenum;

Thus, better mixing of hot gas and dilution air (more margin against sequential burner overheating, lower NOx and CO)

Accordingly, the invention refers to a combustor arrangement of a gas turbine engine or power plant, comprising at least one combustion chamber, at least one mixer arrangement for admixing air or gas to the hot gas flow leaving the combustion chamber. The mixer arrangement is adapted to guide combustion gases in a hot gas flow path extending downstream of the combustion chamber, wherein the mixer comprises a plurality of injection pipes pointing inwards from the side walls of the mixer arrangement for admixing air portions to cool at least the hot gas flow leaving combustion chamber. The mixer arrangement is applied to at least one volume of dilution air flowing from a first plenum and at least one volume of cooling air flowing from a second plenum.

The dilution air flowing from the first plenum charges directly or indirectly at least one injection pipe, whereby the dilution air is originated flowing from the compressor of the gas turbine engine or power plant.

The cooling air flowing from the second plenum is used as effusion cooling air with respect to the inner liner of the hot gas flow.

The cooling air flowing from the second plenum charges directly or indirectly at least one injection pipe, and the cooling air is originated from the precedent cooling of the sequential liner, and that the cooling air flows along a connecting duct, which is disposed annularly around the hot gas flow.

A fuel injector is arranged at the outlet of the mixer arrangement, whereby the fuel injector is cooled by a quantity of dilution air flowing from the first plenum.

Injection pipes pointing inward from the inner liner of the hot gas flow, and are arranged with a regular or irregular partitioning in circumferential direction of the hot gas flow, whereby the injection pipes having a cylindrical, conical or quasi-conical shape. Additionally, the mixer arrangement comprising multiple injection pipe rows along the hot gas flow with equal, similar, different protrusion depth. Furthermore, the injection pipes of the mixer arrangement having an equal, similar, different cross-section.

The injection pipes of a single row extending to the center of the mixer and are arranged in radial direction inversely to each other. Alternatively, at least one injection pipe is inclined with respect to the hot gas flow.

A preferred alternative includes the embodiment that at least one injection pipe having along their protrusion depth a number of injection holes using to inject orthogonally or quasi-orthogonally flowed dilution air into the hot gas flow.

Furthermore, the invention refers to a method for operating a combustor arrangement of a gas turbine engine or power plant, comprising at least one combustion chamber, at least one mixer arrangement for admixing air or gas to the hot gas flow leaving the combustion chamber. Mixer arrangement is adapted to guide combustion gases in a hot gas flow path extending downstream of the combustion chamber, wherein the mixer comprises a plurality of injection pipes pointing inwards from the side walls of the mixer arrangement for admixing air portions to cool at least the hot gas flow leaving combustion chamber. The mixer arrangement is applied to at least one volume of dilution air flowing from a first plenum and at least one volume of cooling air flowing from a second plenum.

Moreover, the proposed mixer arrangement can be operated as a damper, reducing thermo-acoustic coupling between hot gas path and mixer plenum.

BRIEF DESCRIPTION OF THE FIGURES

The disclosure, its nature as well as its advantages, shall be described in more detail below with the aid of the accompanying figures. Referring to the figures.

DETAILED DESCRIPTION OF EXEMPLARY EMBODIMENTS

Figure 1:
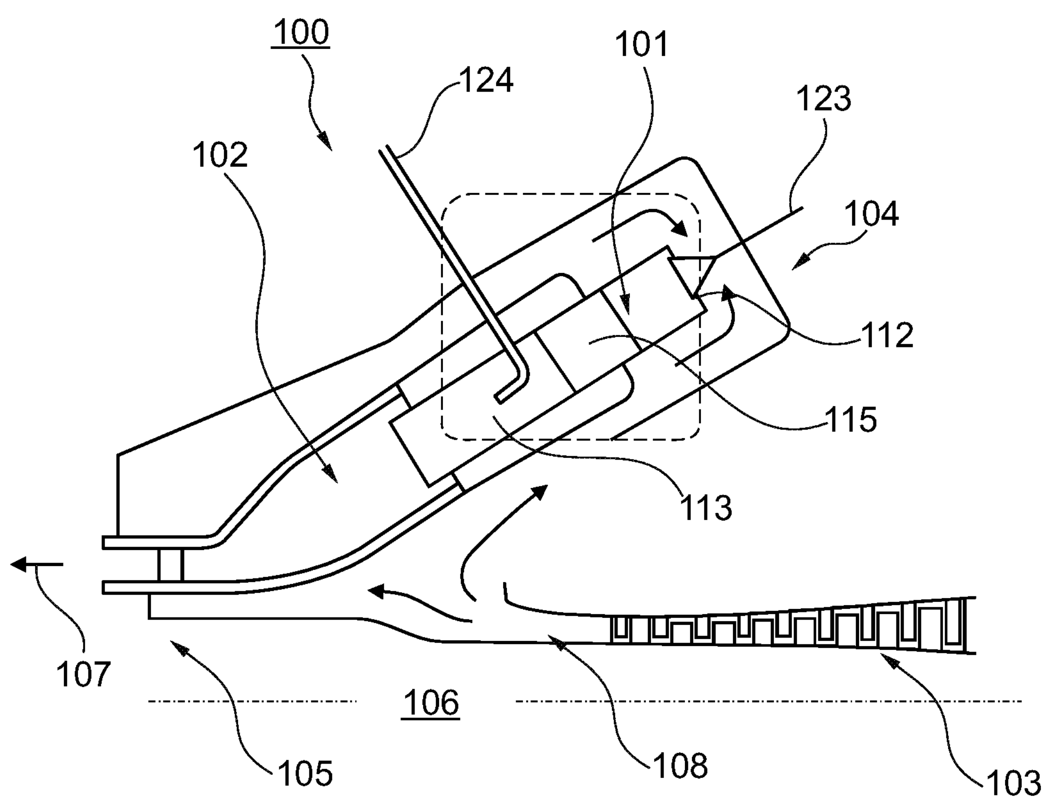
FIG. 1 shows a generic gas turbine engine using sequential combustion with a mixer arrangement for admixing dilution air or a dilution gas.

FIG. 1 shows generalized a gas turbine engine 100 with a sequential combustor arrangement 104 according to the disclosure. It comprises a compressor 103, a combustor arrangement 104, and a turbine 105. The combustor arrangement 104 comprises a first burner 112, a first combustion chamber 101, and a mixer arrangement 115 for admixing a dilution air to the hot gases 109 leaving the first combustion chamber 101 during operation. Downstream of the mixer arrangement 115 the combustor arrangement 104 additionally comprises a second burner 113, and a second combustion chamber 102. The first burner 112, first combustion chamber 101, mixer 115, second burner 113 and second combustion chamber 102 are arranged sequentially in a fluid flow connection. Fuel can be introduced into the first burner 112 via a first fuel injection 123, mixed with compressed air which is compressed in the compressor 103, and combusted in the first combustion chamber 101. Dilution air is admixed in the subsequent mixer arrangement 115. Additional fuel can be introduced into the second burner via a second fuel injection 124, mixed with hot gases 109 leaving the mixer arrangement 115, and combusted in the second combustion chamber 102. The hot gases 109 leaving the second combustion chamber 102 are expanded in the subsequent turbine 105, performing work. The turbine 105 and compressor 103 are arranged on a shaft 106. The remaining heat of the exhaust gas 107 leaving the turbine 105 can be further used in a heat recovery steam generator or boiler (not shown) for steam generation. In the example shown here compressor exit gas is admixed as dilution air. Typically, compressor exit gas is compressed ambient air 108. For gas turbines with flue gas recirculation (not shown) the compressor exit gas is a mixture of ambient air and recirculated flue gas. Typically, the gas turbine system includes a generator (not shown) which is coupled to a shaft 106 of the gas turbine 100.

Figure 2:
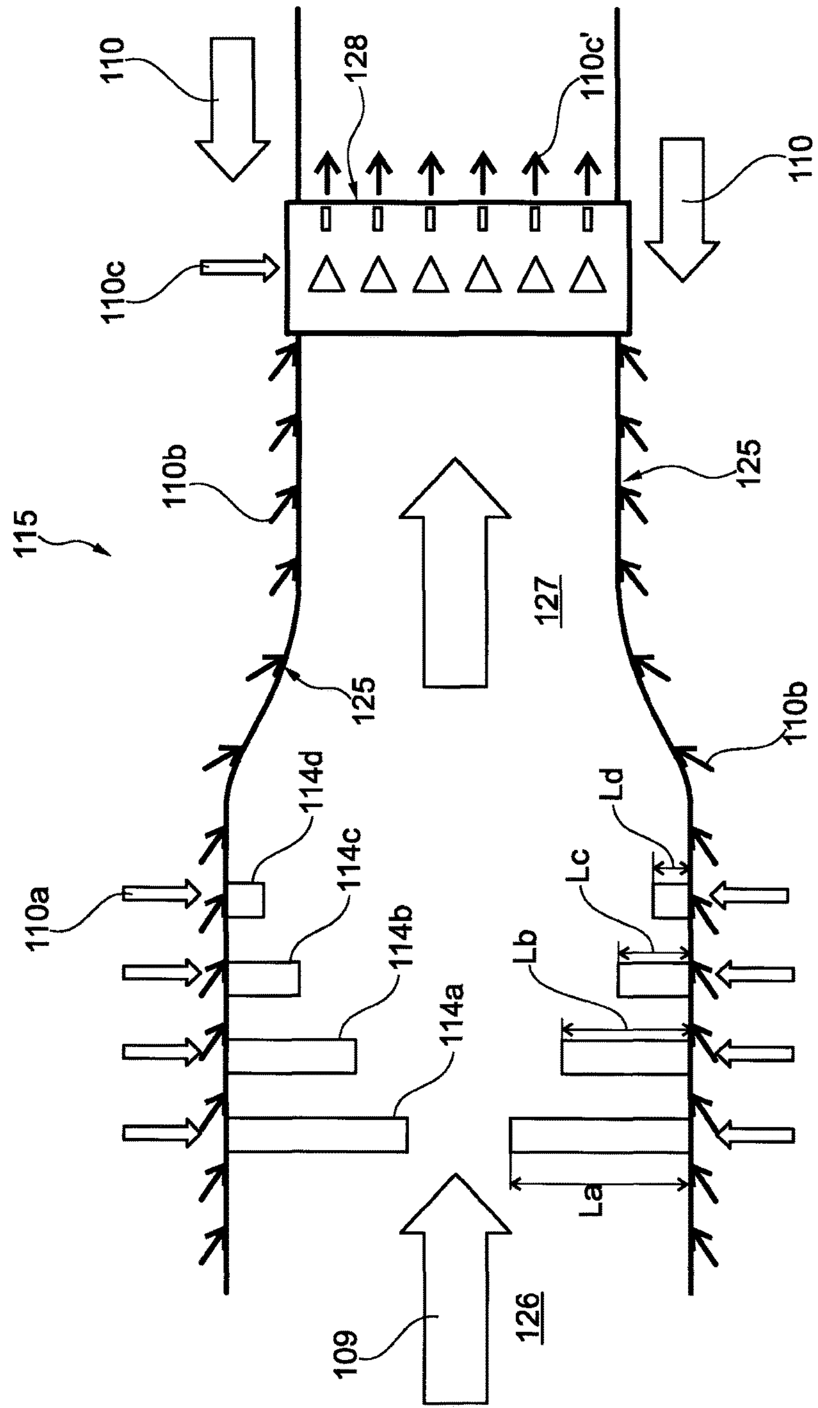
FIG. 2 shows a mixer arrangement of a gas turbine engine comprising an introduction of a cooling air and dilution air.

FIG. 2 shows a dilution air mixer arrangement 115 according to the state of the art. In this example compressed gas from the compressor plenum is guided along combustor liner in a connection duct (not shown, but see WO 2014/063835) as air plenum of the dilution air flow 110. From the mentioned connection duct a first part of the dilution air flow 110 is injected as dilution air 110*a* into the mixer via injection pipes 114 *a-d* having various lengths La-d. Additionally, a second part of the flow air 110 is injected as effusion air 110*b* into the mixer via injection holes 125 disposed along the whole extension of the mixer arrangement 115, i.e. from the hot gas inlet 126 to the mixer outlet 127, precisely to a downstream arranged and cooled 110*c*' fuel injector 128.

The height L a-d of the various subsequently disposed injection pipes 114 *a-c* are chosen such that good mixing of injected dilution air flow 110 with the hot gas 109 leaving the first combustion chamber is assured.

Furthermore, the mixer arrangement 115 comprising at least one or more groups of injection pipes 114 *a-d* pointing inwards from the side walls of the mixer arrangement for admixing the dilution air 110*a* to cool the hot gases 109 leaving the first combustion chamber. The injection pipes 114 *a-d* are circumferentially distributed along the side wall of the mixer arrangement and wherein the injection pipes having a cylindrical, conical or quasi-conical shape addressed to the center of the mixer arrangement.

For example, the injection pipes of a first group have a first protrusion depth into the hot gas flow path 109, the second injection pipes of the second group have a second protrusion depth, the third injection pipes of the third group have a third protrusion, and the fourth injection pipes of the fourth group have a fourth protrusion depth. The mixer arrangement is arranged such that the dilution air is admixed during operation to cool the hot gases 109.

Moreover, the protrusion depth of the injection pipes of the first group compared to the last group may be regularly increasing or decreasing, whereby a mutual depth of the injection pipes along the respective group is also possible.

Additionally, the number of injection pipes can be chosen such that the distance between the exit-openings of neighboring injection pipes are similar. Similar in this context can mean that the distance between exit openings in the group with larger penetration depth one to three times the distance between exit openings of injection pipes of the group with smaller penetration depth. The distance between exit openings can further be increased with the exit diameter of the injection pipes. For example it can be proportional to the exit diameter.

Moreover, the mixer arrangement comprising in the hot gas flow direction at least one row of injection pipes with equal, similar or different protrusion depth, wherein the mixer comprising multiple rows of injection pipes in the hot gas flow direction with equal, similar or different protrusion depth.

At least one injection pipe group is circumferentially distributed along the side wall of the mixer arrangement and having a staggered design relative to a plane normal to the main flow direction of the hot gases flowing through the mixer, wherein the stagger can be designed between 0.1 and 3.5 times the diameter of the relative injection pipes.

The protrusion depth of the injection pipes of the first row is closer to the center of the mixer arrangement than the protrusion depth of a second row, then, the protrusion depth of the second row is closer or further to the center of the mixer than the protrusion depth of the third row, wherein the injection pipes of the single row extending approximately to the center of the mixer and are arranged in radial direction inversely to each other.

The injection pipes can be comprised along their protrusion depth a number of injection holes used to inject orthogonally or quasi-orthogonally the flowed dilution air into the hot gas flow. Furthermore, the injection pipes having uniform or non-uniform conical gradient along the respective protrusion depth.

Moreover, the injection pipes can be inclined in the hot gas flow direction at an angle of less than 90° relative to the flow direction of the hot gases such that the dilution air leaving the pipes have a flow component in the direction of the hot gas flow at the location of the injection.

Figure 3:
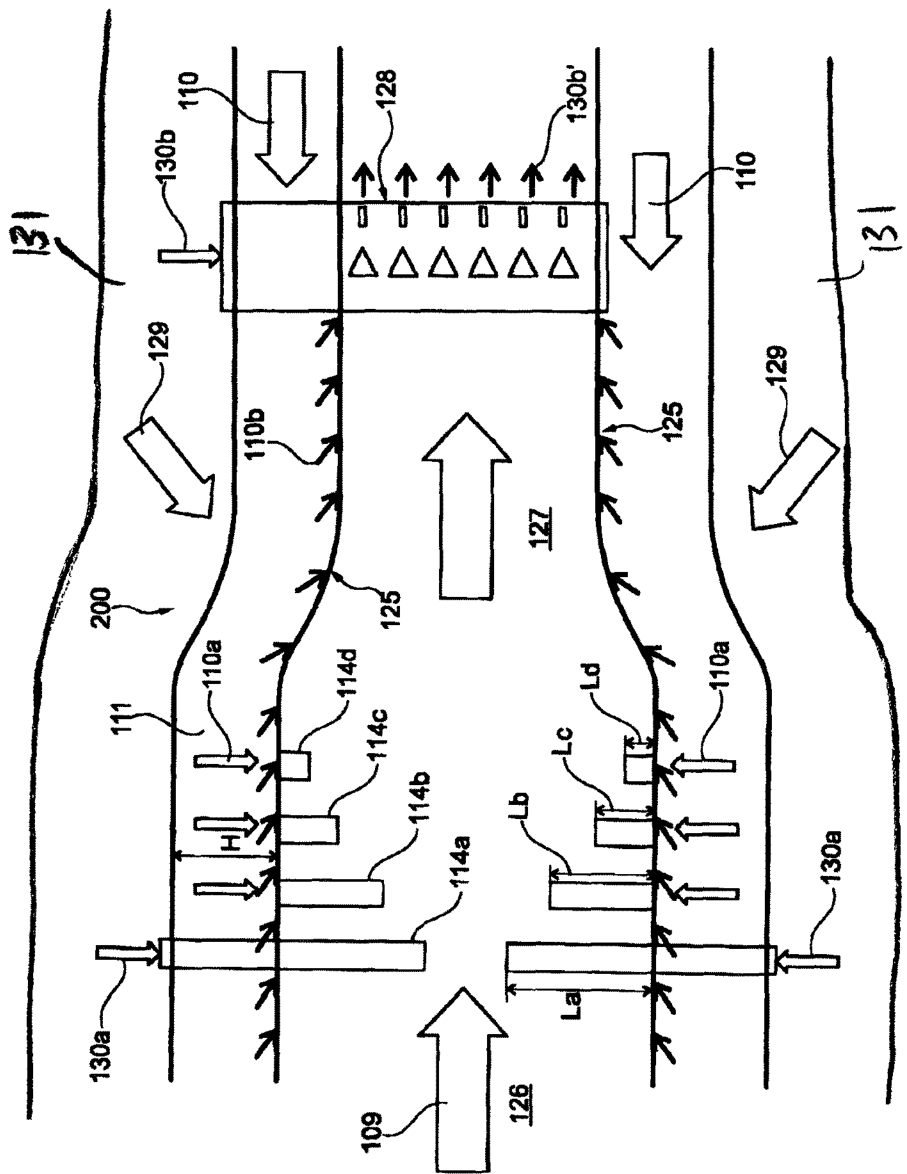
FIG. 3 shows a mixer arrangement of a gas turbine engine comprising an introduction of a cooling air and dilution air coming from two different plena.

FIG. 3 shows a further dilution air mixer arrangement 200. In this example compressed gas from the compressor plenum is guided along combustor liner in a connection duct 111 as air plenum, in which the dilution air flow 110 flows after the sequential liner cooling. The dilution air mixer arrangement 200 can be arranged with an annular cross section. For an annular dilution air mixer arrangement the height H corresponds to the difference between the diameter of an outer wall of the annular flow section and the inner wall of the annular flow section.

From the mentioned connection duct 111 a first part of the flow air 110 is injected as dilution air 110*a* into the mixer arrangement via at least one injection pipe group 114 *a-d* having various lengths La-d. Additionally, a second part of the flow air 110 is injected as effusion air 110*b* into the mixer arrangement via various injection holes 125 disposed along the whole extension of the mixer arrangement 200, i.e. from the hot gas inlet 126 to the mixer outlet 127, precisely to a downstream arranged fuel injector 128.

The height L a-d of the various subsequently disposed injection pipes 114 *a-c* are chosen such that good mixing of injected dilution air flow 110 with the hot gas 109 leaving the first combustion chamber is assured.

Furthermore, the mixer arrangement 115 comprising at least one or more groups of injection pipes 114 *a-d* pointing inwards from the side walls of the mixer arrangement for admixing the dilution air 110*a* to cool the hot gases 109 leaving the first combustion chamber. The injection pipes 114 *a-d* are circumferentially distributed along the side wall of the mixer arrangement and wherein the injection pipes having a cylindrical, conical or quasi-conical shape addressed to the center of the mixer arrangement.

For example, the injection pipes of a first group have a first protrusion depth into the hot gas flow path 109, the second injection pipes of the second group have a second protrusion depth, the third injection pipes of the third group have a third protrusion, and the fourth injection pipes of the fourth group have a fourth protrusion depth. The mixer arrangement is arranged such that the dilution air is admixed during operation to cool the hot gases 109.

Moreover, the protrusion depth of the injection pipes of the first group compared to the last group may be regularly increasing or decreasing, whereby a mutual depth of the injection pipes along the respective group is also possible.

Additionally, the number of injection pipes can be chosen such that the distance between the exit-openings of neighboring injection pipes are similar. Similar in this context can mean that the distance between exit openings in the group with larger penetration depth one to three times the distance between exit openings of injection pipes of the group with smaller penetration depth. The distance between exit openings can further be increased with the exit diameter of the injection pipes. For example it can be proportional to the exit diameter.

Moreover, the mixer arrangement comprising in the hot gas flow direction at least one row of injection pipes with equal, similar or different protrusion depth, wherein the mixer comprising multiple rows of injection pipes in the hot gas flow direction with equal, similar or different protrusion depth.

At least one injection pipe group is circumferentially distributed along the side wall of the mixer arrangement and having a staggered design relative to a plane normal to the main flow direction of the hot gases flowing through the mixer, wherein the stagger can be designed between 0.1 and 3.5 times the diameter of the relative injection pipes.

The protrusion depth of the injection pipes of the first row is closer to the center of the mixer arrangement than the protrusion depth of a second row, then, the protrusion depth of the second row is closer or further to the center of the mixer than the protrusion depth of the third row, wherein the injection pipes of the single row extending approximately to the center of the mixer and are arranged in radial direction inversely to each other.

The injection pipes can be comprised along their protrusion depth a number of injection holes used to inject orthogonally or quasi-orthogonally the flowed dilution air into the hot gas flow. Furthermore, the injection pipes having uniform or non-uniform conical gradient along the respective protrusion depth.

Moreover, the injection pipes can be inclined in the hot gas flow direction at an angle of less than 90° relative to the flow direction of the hot gases such that the dilution air leaving the pipes have a flow component in the direction of the hot gas flow at the location of the injection.

Some of the dilution air 129 could be taken from the upstream compressor plenum 131 with full Pk2 and a lower temperature Tk2. A first part 130*a* of this dilution air 129 is directed to at least one injection pipe group 114*a* but any other combination can be considered. A second part 130*b* of the mentioned dilution air 129 cools 130*b*' the fuel injector 128.

Figure 4:
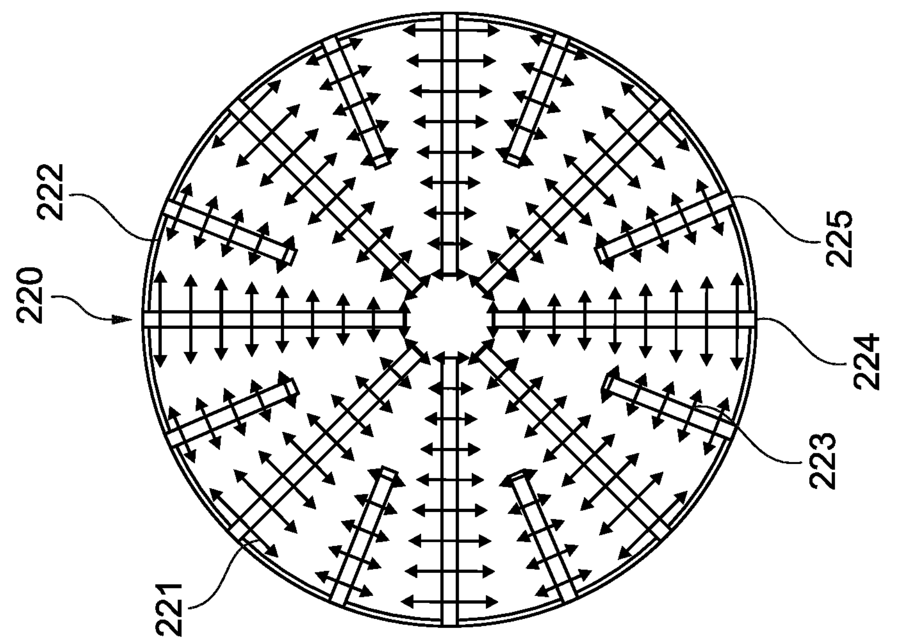
FIG. 4 shows a cross section of a mixer comprising a series of injection pipes mounted circumferentially and extending in radial direction.

FIG. 4 shows a baseline of a preferred embodiment of the invention in which a series of injection pipes 224, 225 are mounted radially and fed by a further plenum with dilution air flow 220. In the Figure the hot gas flow generated by the first combustor flows through the radially disposed long injection pipes 224, and intermediated disposed short injection pipes 225. Both, the long and the short injection pipes are directed radially towards the center of the mixer 222, wherein the long injection pipes 224 extending nearly to the center of the mentioned mixers. The disposition of the injection pipes 224, 225 in the circumferential direction of the mixer is uniformly provided, wherein a non-uniform distribution is also possible. Each injection pipes 224, 225 are also equipped with a large number of injection holes 223 used to inject the flowed dilution air 221 into the hot gas flow 109 (see FIG. 4). The key feature of this mixer 222 reflects a good distribution of such injection holes 223 along the respective radial extension of the injection pipes 224, 225, so that the dilution air flow 220 is pre-distributed and therefore requiring a much shorter mixing time and length. In summary, the injection pipes, characterized by conical or other geometries, are arranged to cover the full cross sectional area with dilution air being injected into the hot gas flow, orthogonal to the page.

Figure 5:
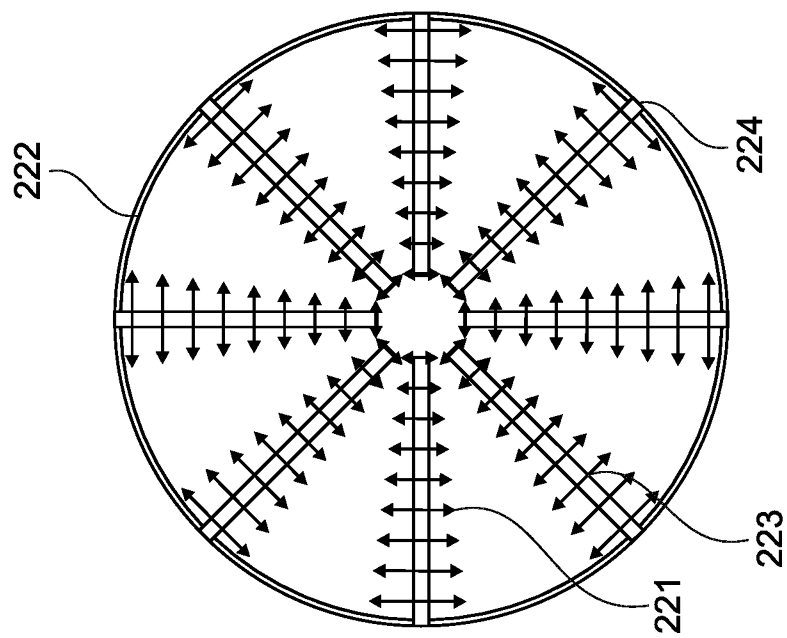
FIG. 5 shows further cross section of a mixer.

FIG. 5 shows a baseline of a further preferred embodiment of the invention in which a series of injection pipes 224 are mounted radially and fed by a further plenum with dilution air flow 220. In the Figure the hot gas flow generated by the first combustor flows through the radially disposed long injection pipes 224, which having uniformly length. Accordingly, the injection pipes 224, as shown, are directed radially towards the center of the mixer 222, and they extending nearly to the center of the mixer. The disposition of the injection pipes 224 in the circumferential direction of the mixer is uniformly provided, wherein a non-uniform distribution is also possible. Each injection pipes 224, are also equipped with a large number of injection holes 223 used to inject the flowed dilution air 221 into the hot gas flow 109 (see FIG. 4). The key feature of this mixer 222 reflects a good distribution of such injection holes 223 along the respective radial extension of the injection pipes 224, so that the dilution air flow 220 is pre-distributed and therefore requiring a much shorter mixing time and length. In summary, the injection pipes, characterized by conical or other geometries, are arranged to cover the full cross sectional area with dilution air being injected into the hot gas flow, orthogonal to the page. All injection pipes possess the same length.

LIST OF REFERENCES NUMEROUS

100 Gas Turbine
101 First combustor chamber
102 Second combustor chamber
103 Compressor

104 Combustor arrangement
105 Turbine
106 Shaft
107 Exhaust Gas
108 Compressed Air
109 Hot gas flow, path
110 Dilution air flowing from a second plenum
**110*a*** Dilution air through the pipe
**110*b*** Dilution air through the effusion hole
**110*c*** Dilution air through the fuel injector
**110*c*'** Dilution air from the fuel injector
111 Connecting duct
112 First burner
113 Second burner
**114*a*** Injection pipe
**114*b*** Injection pipe
**114*c*** Injection pipe
**114*d*** Injection pipe
115 Mixer arrangement
126 Hot gas inlet
127 Mixer outlet
128 Fuel injector
129 Dilution air flowing from a first plenum
**130*a*** First portion
**130*b*** Second portion
**130*b*'** Cooling procedure of the fuel injector
200 Mixer arrangement
220 Dilution air flow
221 Dilution air into the hot gas flow
222 Mixer arrangement
223 Injection hole
224 Injection pipe
225 Injection pipe
L a-d Height of the various injection pipes
H Height of the annular dilution air plenum

The invention claimed is:

1. A combustor arrangement of a gas turbine engine or power plant the combustion combustor arrangement, comprising:

at least one combustion chamber, at least one mixer arrangement for admixing an air or gas portion to hot gas flow leaving the combustion chamber, wherein the at least one mixer arrangement is configured to guide combustion gases in a hot gas flow path extending downstream of the at least one combustion chamber, wherein the at least one mixer arrangement includes a plurality of injection pipes arranged in rows and pointing inwards from side walls of the mixer arrangement for admixing air portions to cool at least a portion of the hot gas flow leaving the combustion chamber, wherein the plurality of injection pipes are arranged in multiple rows along an axial direction of the hot gas flow path, wherein a first group of the plurality of injection pipes is configured to inject into the at least one mixer arrangement at least one portion of dilution air flowing through a first plenum, and a second group of the plurality of injection pipes is configured to inject into the at least one mixer arrangement at least one portion of cooling air originating from a precedent cooling of a sequential liner and flowing through a second plenum, the first plenum being radially outward of the second plenum, and wherein the first group of the plurality of injection pipes is arranged upstream of the second group of the plurality of injection pipes along the hot gas flow path.

2. The combustor arrangement according to claim 1, wherein the at least one portion of dilution air which is to flow from the first plenum will engage directly or indirectly at least one injection pipe of the plurality of injection pipes, whereby the at least one portion of dilution air is supplied from a compressor of the gas turbine engine or power plant, which is connected in combination with the combustion arrangement.

3. The combustor arrangement according to claim 2, wherein the cooling air which is to flow from the second plenum will flow directly or indirectly at least one injection pipe of the plurality of injection pipes inside of a connecting duct.

4. The combustor arrangement according to claim 3, wherein another portion of cooling air which is to flow inside of the connecting duct is supplied from another portion of the cooling air used in cooling of the sequential liner.

5. The combustor arrangement according to claim 4, wherein a fuel injector is arranged at an outlet of the mixer arrangement, whereby the fuel injector will be cooled by a quantity of dilution air when flowing from the first plenum.

6. The combustor arrangement according to claim 5, wherein the cooling air which is to flow from the second plenum will flow along the connecting duct, which is disposed annularly around the hot gas flow path.

7. The combustor arrangement according to claim 1, wherein the at least one portion of cooling air which is to flow from the second plenum is provided as effusion cooling air with respect to an inner liner of hot gas flow.

8. The combustor arrangement according to claim 1, wherein the at least one portion of cooling air which is to flow from the second plenum will engage directly or indirectly at least one injection pipe of the plurality of injection pipes inside of a connecting duct.

9. The combustor arrangement according to claim 1, wherein a fuel injector is arranged at an outlet of the mixer arrangement, whereby the fuel injector will be cooled by a quantity of the at least one portion of dilution air when flowing from the first plenum.

10. The combustor arrangement according to claim 1, wherein the at least one portion of cooling air which is to flow from the second plenum will flow along a connecting duct, which is disposed annularly around the hot gas flow path.

11. The combustor arrangement according to claim 1, wherein the plurality of injection pipes are arranged to point inward from an inner liner of hot gas flow, and are arranged with a regular or irregular partitioning in circumferential direction of hot gas flow.

12. The combustor arrangement according to claim 1, wherein the plurality of injection pipes have a cylindrical, conical or quasi-conical shape.

13. The combustor arrangement according to claim 1, wherein the mixer arrangement comprises multiple injection pipe rows along the hot gas flow path with at least two of the multiple injection pipe rows of an equal, similar, or different protrusion depth.

14. The combustor arrangement according to claim 13, wherein at least two of the multiple injection pipe rows of the mixer have injection pipes of an equal, similar, or different cross-section.

15. The combustor arrangement according to claim 1, wherein the plurality of injection pipes of a single row extend to a center of the mixer and are arranged in radial direction inversely to each other.

16. The combustor arrangement according to claim 1, wherein at least one injection pipe of the plurality of injection pipes is inclined with respect to the hot gas flow path.

17. The combustor arrangement according to claim 1, wherein at least one injection pipe of the plurality of injection pipes has a number of injection holes along a protrusion depth to inject orthogonally or quasi-orthogonally flowed dilution air into the hot gas flow path.

18. The combustor arrangement according to claim 1, wherein the at least one mixer arrangement is configured to operate as a damper.

19. A method for operating a combustor arrangement of a gas turbine engine or power plant, having at least one combustion chamber, at least one mixer arrangement for admixing air or gas to hot gas flow leaving the combustion chamber, wherein the at least one mixer arrangement is configured to guide combustion gases in a hot gas flow path extending downstream of the combustion chamber, wherein the at least one mixer arrangement includes a plurality of injection pipes pointing inwards from side walls of the at least one mixer arrangement, t method comprising:

admixing air portions via the at least one mixer arrangement to cool at least the combustion gases leaving t combustion chamber; and applying the at least one mixer arrangement to act on at least one volume of dilution air flowing from a first plenum and at least one volume of cooling air flowing from a second plenum, wherein the plurality of injection pipes are arranged in multiple rows, wherein a first group of the plurality of injection pipes is configured to inject into the at least one mixer arrangement at least one portion of dilution air flowing through a first plenum, and a second group of the plurality of injection pipes is configured to inject into the at least one mixer arrangement at least one portion of cooling air originating from a precedent cooling of a sequential liner and flowing through a second plenum, and wherein the first group of the plurality of injection pipes is arranged upstream of the second group of the plurality of injection pipes along the hot gas flow path.

* * * * *